Nov. 8, 1966     D. V. BACON     3,283,407
RECIPROCATING KNIFE
Filed Nov. 16, 1964     2 Sheets-Sheet 1
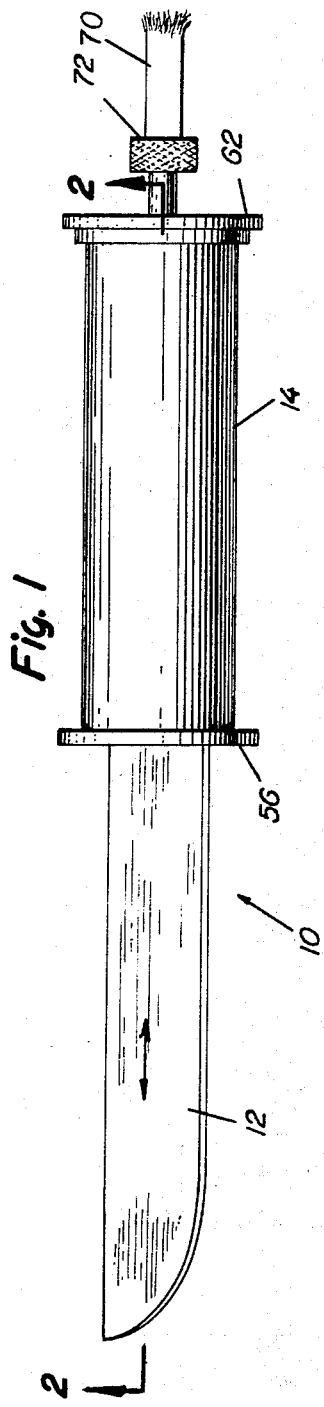
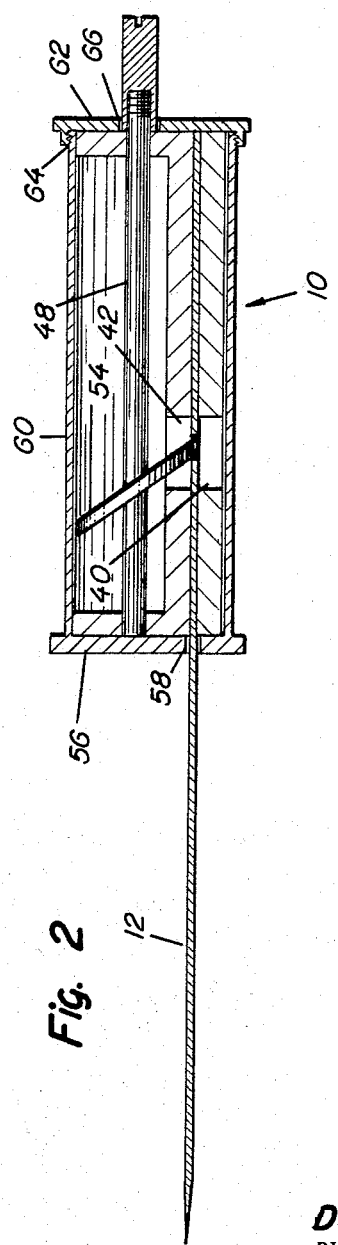
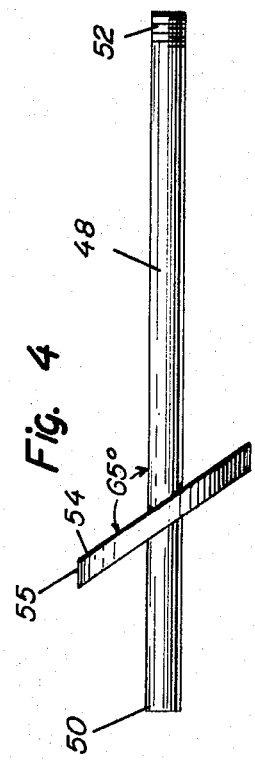
INVENTOR.
Donald V. Bacon
BY
Jacobi & Davidson
ATTORNEYS Nov. 8, 1966 D. V. BACON 3,283,407
RECIPROCATING KNIFE
Filed Nov. 16, 1964 2 Sheets-Sheet 2
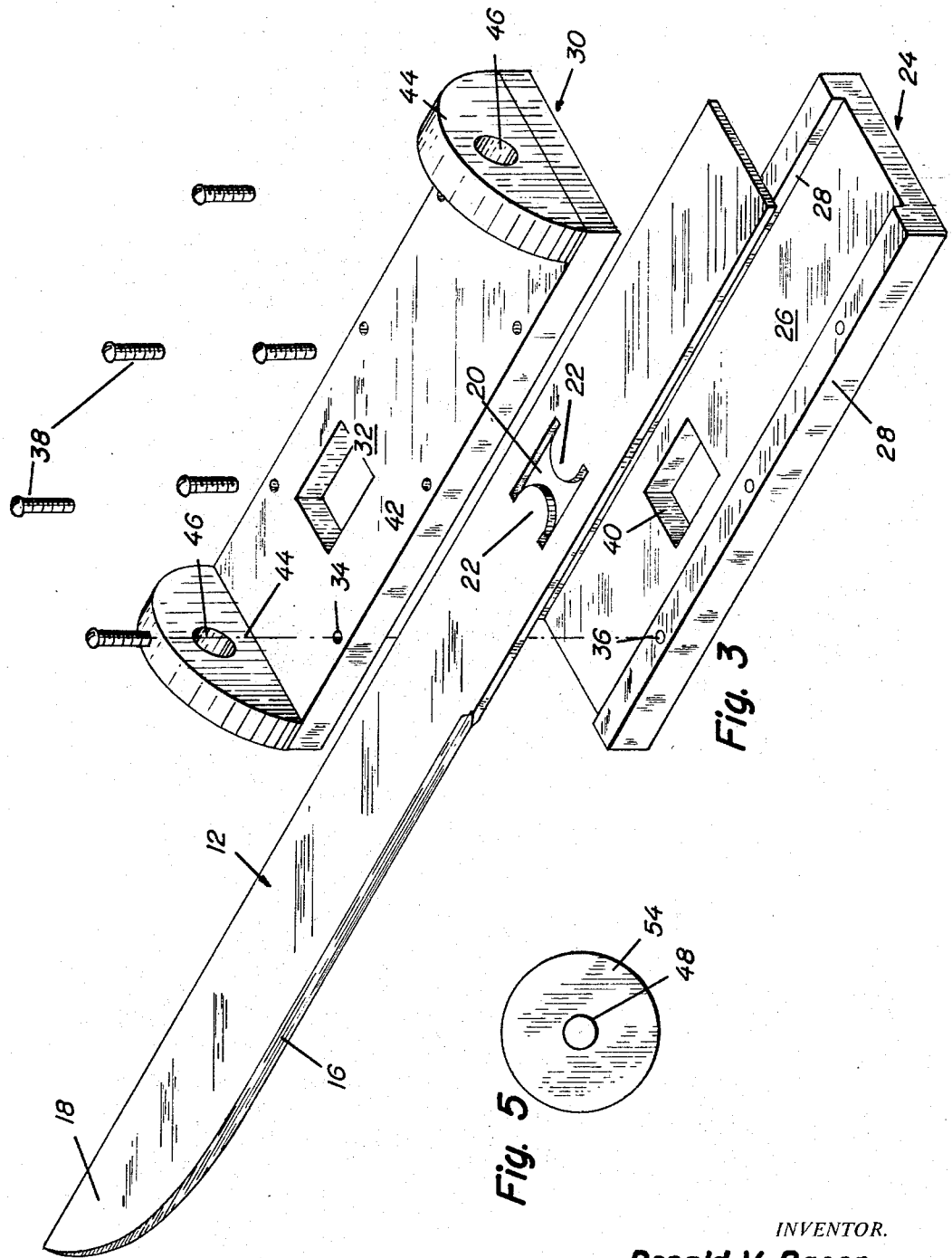
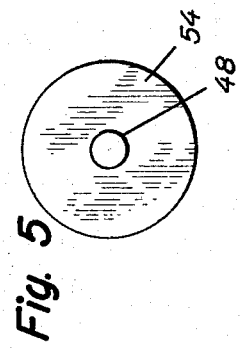
INVENTOR.
Donald V. Bacon
BY
*Jacobi & Davidson*
ATTORNEYS

United States Patent Office 3,283,407
Patented Nov. 8, 1966

3,283,407
RECIPROCATING KNIFE
Donald V. Bacon, 6017 Gateway Green, Madison, Wis.
Filed Nov. 16, 1964, Ser. No. 411,270
6 Claims. (Cl. 30—272)

This invention relates to a reciprocating knife and more particularly it relates to a knife having a blade or cutter element which is alternately driven forwardly and rearwardly to facilitate severing with the knife.

Power operated knives have found wide-spread acceptance in butchering and in meat packing operations, partially due to their ease of manipulation, but more particularly due to their efficient manner of severing. In numerous meat packing and meat cutting operations, it is necessary to cut through meat, through skin, and sometimes even through bone, and manual attempts to perform such operations with non-automatic knives have not proved satisfactory. If the butcher or meat cutter attempts to cut to any depth with a conventional non-automatic knife, it is extremely difficult to maintain the direction and the angle of the knife blade during cutting, and such difficulty increases when skin and/or bone are encountered. Moreover, as will be apparent, cutting with such a non-automatic knife requires an exertion of great effort on the part of the operator, and is slow and cumbersome in use.

On the basis of the foregoing material, it should be apparent that it would be beneficial to provide an automatic or power-operated knife which could be used in the various meat cutting industries. Such a knife would enable an operator to sever without the exertion of undue effort, and would allow such an operator to accurately control the direction and the angle of the knife blade. In such a manner, the meat could be more accurately cut and trimmed, thus preventing improperly sized segments of meat. Moreover, the speed at which such a knife performed its severing operation would be far in excess of that of a conventional knife, and accordingly, a single operator could produce a much greater output of cut and trimmed meat.

There have, of course, been numerous efforts and attempts to provide automatic or power-operated knives. Generally, however, such prior art forms of automatic knives have been of two types. One such type is basically a solenoid operated knife, wherein a solenoid coil is provided within the knife handle, and wherein the knife blade either forms or is attached to the solenoid plunger. Then, by varying the electrical energy supplied to the coil, the plunger and thus the knife blade is moved alternately into and out of the coil. An example of such a prior art automatic knife is that shown in United States Patent No. 2,753,470, issued to O. Armstrong. It should be apparent that there are numerous drawbacks to this type of automatic knife, with the most obvious drawback being that of safety. Since electrical energy is supplied directly to the knife handle, which must be gripped by an operator's hand which is often wet with blood or moisture, from the meat being cut, there is a strong likelihood that the operator might receive a severe electrical shock during operation of the knife.

The other basic form of prior art automatic knife was that which employed a gear train to reciprocate the knife blade. Such a knife generally had a pair of hypoid or bevel gears which intermeshed with one another, with one such gear being driven by an operating motor and the other such gear being connected either directly or indirectly to the cutting blade. An example of such a prior art form of knife is shown in United States Patent No. 2,945,298, issued to E. Guttmann. The major drawback with automatic knives of this type was in the fact that the operating mechanism was unduly complicated, thus causing the knife to be quite expensive. For example, each of the gears needed to be separately housed in the handle, in proper bearing mounts, and additionally, the driven gear itself, had to be accurately connected to the knife blade, which in turn was often mounted in still further bearings. All of these separate bearings, mounting means, and separate intermeshing elements were naturally difficult to assemble in the handle, thus making the entire unit costly and complicated. As a further point in connection with these gear driven knives, if tiny segments of bone or meat happened to work their way into the interior of the handle, such segments would jam the gears and render the knife inoperative. In such an event, the entire knife had to be disassembled and cleaned, and because of the complicated arrangements within the knife, such diassembly and subsequent reassembly could not be performed by the usual operator, but instead, had to be performed by a skilled mechanic.

With the foregoing factors in mind, it is, therefore, an object of the present invention to overcome the difficulties and deficiencies associated with prior art forms of automatic knives and to provide in their stead, an improved power-operated reciprocating knife.

Another object of the present invention is to provide a reciprocating knife having a minimum of parts, and which can be readily disassembled and reassembled by the normal operator, without requiring the assistance of any specially skilled technician.

Another object of the present invention is to provide a reciprocating knife wherein the drive means can be readily replaced to thus allow the stroke of blade reciprocation to be varied.

Other objects of the present invention include the provision of a knife which (a) approximates the size and shape of a conventional non-automatic knife and which can be used in the same manner thereas, (b) is safe in operation and does not present any undue hazards to the operator, (c) can be entirely immersed in water to allow the knife to be cleaned after use, (d) is light-weight and easily manipulable, (e) is formed of durable, rust-resistant parts which are designed to provide long periods of uninterrupted service without maintenance, (f) is inexpensive to manufacture, and assemble, and (g) serves as an efficient and accurate severing instrument.

Numerous other objects, advantages and salient features of the present invention will become apparent from the following detailed description, which, taken in connection with the annexed drawings, discloses a preferred embodiment thereof.

The foregoing objects are attained by providing a knife having a blade with an opening therein, a guide means within which such blade is mounted for reciprocation, and a driving means including a portion extending into the blade opening for reciprocating the blade. The drive means is rotatably driven by a power source remote from the knife, with a flexible cable being used to couple the power source with the drive means.

Referring to the drawings:

FIGURE 1 is a side elevational view of a reciprocating knife in accordance with the principles of the present invention;

FIGURE 2 is a longitudinal sectional view taken substantially along line 2—2 of FIGURE 1;

FIGURE 3 is an exploded perspective view showing the knife blade and the blade mounting means;

FIGURE 4 is a side elevational view of a drive shaft utilized in the reciprocating knife of the present invention; and, FIGURE 5 is an end view of the drive shaft of FIGURE 4.

In accordance with the principles of the invention, and as can be seen generally from FIGURE 1 of the drawings, there is provided a reciprocating knife generally designated 10 and having an elongated cutting blade generally designated 12 and a handle or blade mounting means generally designated 14.

The blade 12 is formed of stainless steel or some other non-corrosive and rust-proof material, and is provided with a sharpened cutting edge 16. The forward end of the blade tapers to a point 18 while adjacent the rearward end of the blade, a shaped aperture or opening 20 is provided. The opening 20 is preferably formed with an H-shape, and thus has a pair of ears 22 projecting axially of the blade into the opening 20.

On the interior of the handle 14, a means must be provided to create a track within which the blade 12 can reciprocate. To this end, a pair of blade guide members are provided. The lower guide member is generally designated 24, and includes a generally flat base portion 26 having a width substantially equal to the width of the blade 12, and a pair of upstanding side flanges 28 which extend upward to a height approximately equal to the thickness of the blade.

An upper blade guide member generally designated 30 is formed with a flat base portion 32 designed to overlie the lower blade guide member 24. A series of spaced peripheral holes 34 are provided in the base 32 on the upper member, and these holes are adapted to be placed in alignment with holes 36 in the flanges 28 of the lower member. Then, a series of screws 38 can be inserted through the aligned holes 34 and 36 to secure the members 24 and 30 in attachment with one another. When the members are so attached, it will be seen that a track is formed for mounting the rear end of the blade 12 for reciprocating movement. This track is bounded on its lower side by the base 26, and its upper side by base 32, and at its lateral edges by the flanges 28.

An aperture 40, preferably rectangular in shape, is provided toward the forward end of the base 26 of the lower member 24. A similar aperture 42 is formed in the base 32 of the upper member 30. When the members 24 and 30 are secured to one another by the screws 38, the apertures 40 and 42 are in superposed alignment, and when the blade is properly situated within its track, the opening 20 within the blade lies between the openings 40 and 42.

At opposite ends of the upper blade guide member 30, upstanding bearings 44 are provided. These bearings may be formed integrally with the base plate 32, or alternatively, they may be formed separately from the base plate and be suitably secured thereto. Each bearing is provided with an axial aperture 46 which serves to mount the ends of a drive shaft to be presently described. The bearings themselves may be formed of brass or other suitable material, and to increase the bearing efficiency, a solid lubricant, such as powdered graphite or self-lubricating plastic, may be impregnated into the walls of the apertures 46.

The drive shaft itself, as can be seen in FIGURES 2 and 4, is formed of an elongated shaft 48 having an unthreaded forward end 50 and a threaded rear end 52. The drive shaft is provided with an angularly disposed portion 54 to form the driving means for reciprocating the knife blade 12, and this angularly disposed portion is formed by a preferably circular cam plate, which surrounds the shaft 48 and is inclined at an angle to the central axis thereof. In the preferred embodiment, the angle of inclination of the plate 54 with respect to the central axis of the shaft 48 is 65°. The plate 54 has a flat edge 55, all points of which are equiradially spaced from the central axis of the shaft 48. However, it will be understood that various drive shafts can be used in this knife, with each of such drive shafts having a plate inclined at a different angle. In this way, the stroke of reciprocation of the knife blade can be selectively varied to a desired value.

In assembling the knife components, as shown in FIGURE 2, the blade guide members 24 and 30 are suitably fastened together by the screws 38, and the rear end of the blade 12 is placed within its sliding track. Then, the drive shaft 48 is inserted into the upper member 30, with the forward end 50 of the shaft being located within one aperture 46, and the rear end 52 of the shaft projecting through and beyond the rearward aperture 46. With the parts assembled in such a manner, the plate 54 projects through the upper opening 42 and through the opening 20 in the knife blade 12. In this manner, a portion of the cam plate 54 is located between the ears 22 in the blade opening 20. A handle casing is then slipped over the assembled parts, again as shown in FIGURE 2. The handle casing includes a forward wall 56 having a slot 58 therein through which the blade can extend, and it further includes a rearwardly extending hollow shaped portion 60 which serves as the grip for the operator's hand. The forward portion 56 is enlarged somewhat beyond the outer limits of the portion 60 in order to act as a hand guide to assure that the operator's hand will not inadvertently slip from the portion 60 into contact with the sharpened cutting edge 16 on the blade 12. To retain the handle casing 60 in place, a rear cap 62 is provided, and this cap is attached to the handle portion 60 by mating screw threads 64. An aperture 66 is provided within the rear cap in alignment with the rear end 52 of the drive shaft 48. When all of the parts have been suitably assembled, a small driving sleeve 68 is introduced through the hole 66 and is threaded onto the rear portion of the drive shaft 48. In this manner, rotation of the drive sleeve 68 will in turn impart rotational movement to the drive shaft 48 and hence to the cam plate 54 thereon.

A flexible conduit or cable 70 extends from a suitable power supply means, such as an electric motor, and is attached to the drive sleeve 68 by a knurled collar 72 or other suitable fastening means. When the electric motor is operated, it imparts a rotational movement which is transmitted through the flexible conduit to rotate the drive sleeve 68. When the drive sleeve 68 rotates, it in turn rotates the drive shaft 48 and the cam plate 54 thereon. As aforementioned, the cam plate is disposed within the opening 20 in the knife blade, and engage the inwardly extending ears 22. Thus, during rotation of the cam plate 54, the knife blade is first moved forwardly and then rearwardly, to thus effect the desired blade reciprocation.

As will be apparent, there are a minimum of cooperating parts within the handle means 14, and accordingly, operation of the knife, is greatly simplified. Moreover, even if blood or moisture from the meat, or bone or meat segments themselves, were to work their way into the interior of the casing 60, the knife would still continue to function in a satisfactory manner. Also, it will be seen that the entire knife can be easily cleaned by merely immersing the same in water.

After reading the foregoing detailed description, it should be apparent that the objects set forth at the outset of this specification have been successfully achieved. Accordingly, what is claimed is:

1. A reciprocating knife comprising:
an elongated blade having a sharpened cutting edge and a shaped central opening adjacent the rear end of said blade;
blade guide means surrounding said blade rear end and providing a track for reciprocating movement of said blade;
said blade guide means having aperture means therein with said aperture means being juxtaposed in alignment to said blade opening;
a blade drive means including an elongated drive shaft having a central axis and a cam plate surrounding said shaft and being disposed at an angle to said central axis;

means rotatably mounting said blade drive means adjacent said blade guide means with said cam plate projecting through said aperture means and into said blade opening; and handle casing means surrounding said blade guide means and said blade drive means to provide a gripping surface permitting an operator to hold said knife;

said handle casing means having a casing opening adjacent one end thereof;

said drive shaft extending at least partially into said casing opening and being adapted for connection with a flexible driving cable coupled to a suitable power source remote from said casing means whereby operation of said power source imparts a rotational movement to said driving cable and in turn to said drive shaft, with said drive shaft rotational movement being converted to an alternating translational movement of said blade by means of the cooperative connection formed by said cam plate and said blade opening.

2. A reciprocating knife as defined in claim 1 wherein said angle at which said cam plate is disposed to said drive shaft central axis is substantially 65°.

3. A reciprocating knife as defined in claim 4 wherein said blade guide means includes a first member having a flat base portion against which said blade abuts and a pair of upstanding side flanges extending upwards on opposite edges of said blade to thus define said track.

4. A reciprocating knife as defined in claim 3 wherein said blade guide means includes a second member having marginal edges abutting said side flanges, said side flanges being provided with a series of spaced holes and said marginal edges being provided with a similar series of spaced holes whereby, through the use of fastening screws, said first and second members may be secured together.

5. A reciprocating knife as defined in claim 1 wherein said blade opening is generally H-shaped.

6. A reciprocating knife as defined in claim 1 wherein said means rotatably mounting said blade guide means includes a pair of spaced upstanding bearings within which said drive shaft is journalled.

References Cited by the Examiner

UNITED STATES PATENTS

| | | | |
|---|---|---|---|
| 1,341,047 | 5/1920 | Dingwall | 30—272 X |
| 1,617,924 | 2/1927 | Russell | 30—272 |
| 1,679,884 | 8/1928 | Thomas. | |
| 2,168,703 | 8/1939 | Dziedzic et al. | 30—173 |
| 2,596,078 | 5/1952 | Prohaska. | |
| 2,990,614 | 7/1961 | Taggart | 30—272 |
| 3,193,925 | 7/1965 | Hawley | 30—210 |

FOREIGN PATENTS

| | | |
|---|---|---|
| 40,865 | 9/1929 | Denmark. |
| 1,116,778 | 2/1956 | France. |

WILLIAM FELDMAN, *Primary Examiner.*

JAMES L. JONES, Jr., *Examiner.*